US011702064B2

(12) United States Patent
Tan et al.

(10) Patent No.: US 11,702,064 B2
(45) Date of Patent: Jul. 18, 2023

(54) HYBRID VEHICLE

(71) Applicant: TOYOTA JIDOSHA KABUSHIKI KAISHA, Toyota (JP)

(72) Inventors: Guodong Tan, Toyota (JP); Atsushi Onomoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/815,028

(22) Filed: Jul. 26, 2022

(65) Prior Publication Data

US 2023/0043501 A1 Feb. 9, 2023

(30) Foreign Application Priority Data

Aug. 3, 2021 (JP) .................................. 2021-127406

(51) Int. Cl.
| | |
|---|---|
| *B60W 20/40* | (2016.01) |
| *B60W 10/02* | (2006.01) |
| *B60W 10/06* | (2006.01) |
| *B60W 10/30* | (2006.01) |
| *B60W 10/08* | (2006.01) |

(52) U.S. Cl.
CPC .......... *B60W 20/40* (2013.01); *B60W 10/023* (2013.01); *B60W 10/06* (2013.01); *B60W 10/08* (2013.01); *B60W 10/30* (2013.01); *B60W 2710/027* (2013.01); *B60W 2710/083* (2013.01)

(58) Field of Classification Search
CPC .... B60W 20/40; B60W 10/023; B60W 10/06; B60W 10/08; B60W 10/30; B60W 2710/027; B60W 2710/083; B60W 2510/0208; B60W 2510/0275; B60W 2520/0657; B60W 2510/083; B60W 2710/0666

See application file for complete search history.

(56) References Cited

U.S. PATENT DOCUMENTS

| | | | | |
|---|---|---|---|---|
| 10,300,908 B2 * | 5/2019 | Ishida | ..................... | B60K 6/547 |
| 10,421,450 B2 * | 9/2019 | Iwamitsu | ............... | B60W 10/08 |
| 11,027,731 B2 * | 6/2021 | Cho | ......................... | B60W 10/08 |
| 2007/0102207 A1 * | 5/2007 | Yamanaka | ............ | B60W 20/10 |
| | | | | 180/65.31 |
| 2012/0270700 A1 | 10/2012 | Kamioka et al. | | |
| 2013/0297128 A1 * | 11/2013 | Takamura | .............. | B60W 10/02 |
| | | | | 180/65.265 |

(Continued)

FOREIGN PATENT DOCUMENTS

| | | |
|---|---|---|
| JP | 2012-225295 A | 11/2012 |
| JP | 2017-067246 A | 4/2017 |

(Continued)

*Primary Examiner* — Jacob S. Scott
*Assistant Examiner* — Farhana Pervin
(74) *Attorney, Agent, or Firm* — Finnegan, Henderson, Farabow, Garrett & Dunner, LLP

(57) ABSTRACT

A hybrid vehicle includes an engine and an electric motor as driving power sources, a clutch of a hydraulic type provided between the engine and the electric motor, an electric oil pump that supplies hydraulic pressure to the clutch, a mechanical oil pump that interlocks with a rotation of the electric motor and supplies hydraulic pressure to the clutch, and a controller that controls the electric motor and the electric oil pump.

3 Claims, 4 Drawing Sheets

(56) References Cited

U.S. PATENT DOCUMENTS

| | | | | |
|---|---|---|---|---|
| 2013/0297135 A1* | 11/2013 | Yamanaka | ............ | B60W 10/11 |
| | | | | 180/65.265 |
| 2013/0297136 A1* | 11/2013 | Yamanaka | ............ | B60W 10/10 |
| | | | | 903/930 |
| 2014/0352492 A1* | 12/2014 | Nefcy | .................. | B60W 10/08 |
| | | | | 74/7 C |
| 2015/0274147 A1* | 10/2015 | Nefcy | .................... | B60K 6/547 |
| | | | | 903/902 |
| 2015/0314778 A1* | 11/2015 | Matsui | .................... | B60L 50/16 |
| | | | | 180/65.265 |
| 2015/0336571 A1* | 11/2015 | Kuwahara | ............... | B60K 6/48 |
| | | | | 180/65.265 |
| 2016/0032990 A1* | 2/2016 | Nedorezov | ........... | F16D 48/066 |
| | | | | 477/174 |
| 2017/0137017 A1* | 5/2017 | Cho | ...................... | B60W 10/08 |
| 2019/0359216 A1* | 11/2019 | Yamada | ................ | B60K 6/387 |

FOREIGN PATENT DOCUMENTS

| | | |
|---|---|---|
| JP | 2019-002495 A | 1/2019 |
| JP | 2019-209790 A | 12/2019 |

\* cited by examiner

HYBRID VEHICLE

CROSS-REFERENCE TO RELATED APPLICATION

This application is based upon and claims the benefit of priority of the prior Japanese Patent Application No. 2021-127406, filed on Aug. 3, 2021, the entire contents of which are incorporated herein by reference.

FIELD OF THE INVENTION

The present disclosure relates to a hybrid vehicle.

BACKGROUND

A hybrid vehicle includes an electric oil pump that supplies hydraulic pressure to a clutch of a hydraulic type located between an engine and an electric motor as driving power sources, and a mechanical oil pump that interlocks with a rotation of the electric motor and that supplies hydraulic pressure to the clutch. When the engine starts in such a hybrid vehicle, hydraulic pressure is supplied to the clutch by the electric oil pump, which brings the clutch into an engaged state. Next, hydraulic pressure is supplied to the clutch by the mechanical oil pump while the electric motor cranks the engine (see, for example, Japanese Unexamined Patent Application Publication No. 2019-209790).

The electric motor as the driving power source is capable of cranking the engine. Therefore, the electric motor has large output torque. The mechanical oil pump interlocking with the rotation of the electric motor having such large output torque is capable of supplying high hydraulic pressure to the clutch and is capable of greatly increasing a transmission torque capacity of the clutch. Herein, if the electric oil pump increases the transmission torque capacity of the clutch to the same level as the mechanical oil pump increases the transmission torque capacity of the clutch before the cranking starts, power consumption of the electric oil pump might increase.

SUMMARY OF THE INVENTION

It is therefore an object of the present disclosure to provide a hybrid vehicle suppressing power consumption of an electric oil pump and being capable of suitably starting an engine.

The above object is achieved by a hybrid vehicle including: an engine and an electric motor as driving power sources; a clutch of a hydraulic type provided between the engine and the electric motor; an electric oil pump that supplies hydraulic pressure to the clutch; a mechanical oil pump that interlocks with a rotation of the electric motor and supplies hydraulic pressure to the clutch; and a controller that controls the electric motor and the electric oil pump, wherein the controller includes: a first control unit that increases a transmission torque capacity of the clutch to a first torque value by driving the electric oil pump, when the engine and the electric motor stop and there is a request to start the engine; and a second control unit that cranks the engine by driving the electric motor and increases the transmission torque capacity to a second torque value greater than the first torque value by driving the mechanical oil pump interlocking with the rotation of the electric motor, after the transmission torque capacity reaches the first torque value.

The second control unit may increase the transmission torque capacity to the second torque value while gradually increasing output torque of the electric motor.

Magnitude of the first torque value may be 50% or less of magnitude of the second torque value.

The first torque value may be smaller than a reaction force torque value of the engine when the electric motor cranks the engine, and the second torque value may be greater than the reaction force torque value.

DETAILED DESCRIPTION

[Schematic Configuration of Hybrid Vehicle]

Figure 1:
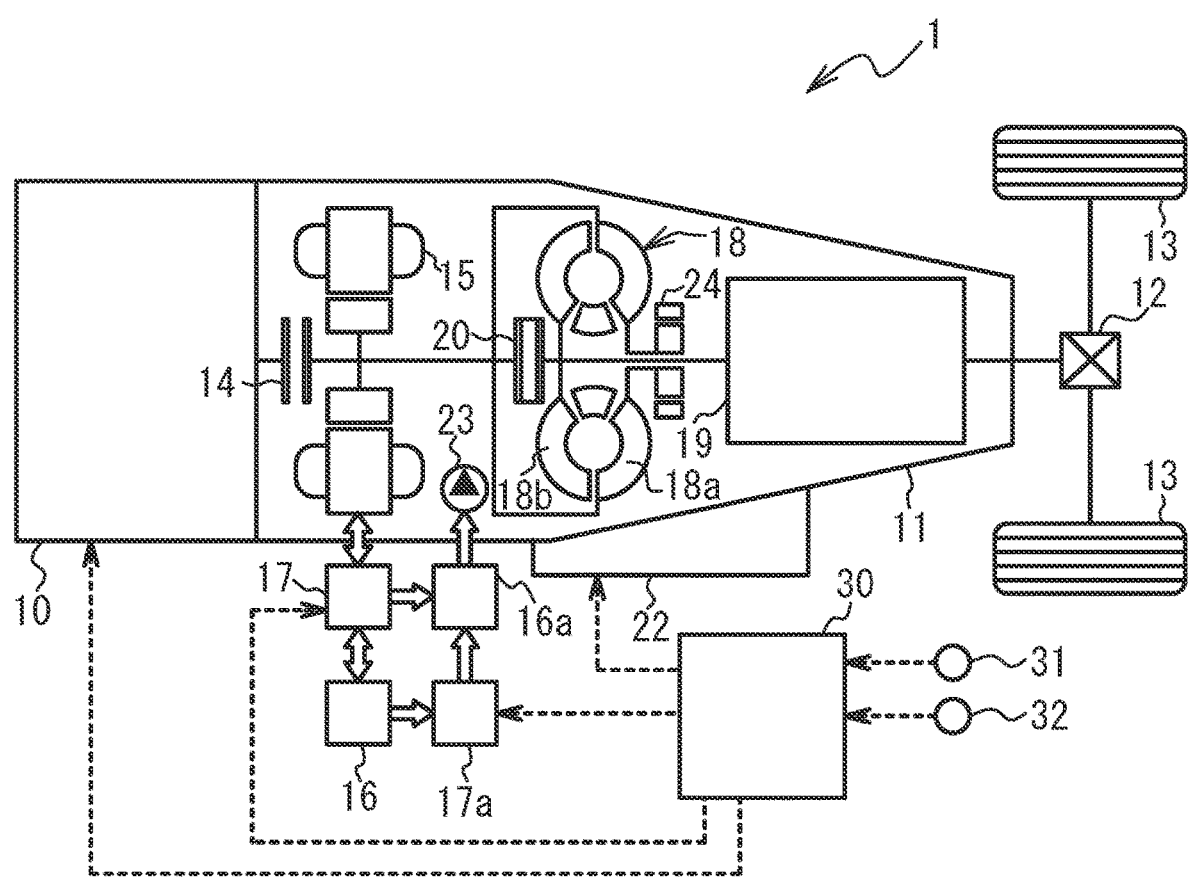
FIG. 1 is a schematic configuration view of a hybrid vehicle.

FIG. 1 is a schematic configuration view of a hybrid vehicle 1. The hybrid vehicle 1 is equipped with an engine 10 and an electric motor 15 as driving power sources. The engine 10 is, for example, a gasoline engine, but may be a diesel engine. A transmission unit 11 is provided on a power transmission path from the engine 10 to wheels 13. The transmission unit 11 and the left and right wheels 13 are driven and connected via a differential gear 12.

The transmission unit 11 is provided with a K0 clutch 14 and the electric motor 15. In the transmission unit 11, the electric motor 15 is located on the power transmission path from the engine 10 to the wheels 13.

The K0 clutch 14 is provided between the engine 10 and the electric motor 15 on the power transmission path. In the K0 clutch 14, a clutch piston moves against urging force of a return spring by hydraulic pressure of hydraulic oil supplied from an electric oil pump 23 and a mechanical oil pump 24. The clutch piston presses one of two rotatable friction plates to the other. As a result, friction is generated between the friction plates so as not to rotate relative to each other, so that the friction plates engage with each other. Herein, the frictional force acting between the two friction plates changes according to the hydraulic pressure of the hydraulic oil supplied to the K0 clutch 14, which changes the transmission torque capacity capable of being transmitted between the two friction plates. That is, the transmission torque capacity of the K0 clutch 14 increases as the hydraulic pressure supplied to the K0 clutch 14 increases. When the K0 clutch 14 is in an engaged state, the engine 10 and the electric motor 15 are engaged with each other, which transmits power therebetween. When the supply of hydraulic pressure to the K0 clutch 14 is stopped, the K0 clutch 14 is opened. As a result, the power transmission between the engine 10 and the electric motor 15 is cut off.

The electric motor 15 is connected to a main battery 16 via an inverter 17. The electric motor 15 functions as an electric motor that generates a driving force of a vehicle in response to power supplied from the main battery 16. The electric motor 15 also functions as a generator that generates electric power to charge the main battery 16 in response to power transmission from the engine 10 and the wheels 13.

The electric power transmitted and received between the electric motor 15 and the main battery 16 is adjusted by the inverter 17.

An auxiliary battery 16a is connected to the main battery 16 via a DC/DC converter 17a. The DC/DC converter 17a decreases high voltage power of the main battery 16 and outputs low voltage power to the auxiliary battery 16a. The auxiliary battery 16a is a secondary battery such as a lead storage battery. The auxiliary battery 16a is charged by the low voltage power output by the DC/DC converter 17a. The auxiliary battery 16a supplies low voltage power to auxiliary equipment of the vehicle. The auxiliary equipment includes the electric oil pump 23, which will be described later, an air conditioner compressor, a head light, and the like.

The transmission unit 11 is provided with a torque converter 18 and an automatic transmission 19. The torque converter 18 is a fluid coupling having a torque amplification function. The automatic transmission 19 is a stepped automatic transmission that switches a gear ratio in a stepwise manner by switching gear stages. In the transmission unit 11, the automatic transmission 19 is provided between the electric motor 15 and the wheels 13 on the power transmission path. A pump impeller 18a of the torque converter 18 is connected to the electric motor 15 and to the engine 10 via the K0 clutch 14. A turbine impeller 18b of the torque converter 18 is connected to the automatic transmission 19. The torque converter 18 is provided with a lockup clutch 20. The lockup clutch 20 receives hydraulic pressure, which is brought into the engaged state to directly connect the electric motor 15 and the automatic transmission 19.

Further, the transmission unit 11 is provided with a hydraulic control mechanism 22, the electric oil pump 23, and the mechanical oil pump 24. Hydraulic pressure generated by the electric oil pump 23 and the mechanical oil pump 24 is supplied to each of the K0 clutch 14, the torque converter 18, the automatic transmission 19, and the lockup clutch 20 via the hydraulic control mechanism 22. The hydraulic control mechanism 22 is provided with hydraulic circuits for each of the K0 clutch 14, the torque converter 18, the automatic transmission 19, and the lockup clutch 20, and various hydraulic control valves for controlling the hydraulic pressure supplied thereto.

The electric oil pump 23 is driven by receiving electric power supplied from the auxiliary battery 16a, and supplies hydraulic pressure to the K0 clutch 14 and the like. The mechanical oil pump 24 is connected to the pump impeller 18a of the torque converter 18. The pump impeller 18a is connected to the electric motor 15. Therefore, the pump impeller 18a also rotates in conjunction with the rotation of the electric motor 15. As a result, the mechanical oil pump 24 is driven, and hydraulic pressure is supplied to the K0 clutch 14 and the like. The electric oil pump 23 and the mechanical oil pump 24, described later in details, supply hydraulic pressure to the K0 clutch 14 so as to maintain the engaged state of the K0 clutch 14, when the engine 10 is started by cranking by the electric motor 15.

The hybrid vehicle 1 is provided with an electronic control unit (ECU) 30. The ECU 30 is an electronic control unit including an arithmetic processing circuit executing various arithmetic processing related to vehicle driving control, and a memory in which control programs and data are stored. The ECU 30 is an example of a controller, and functionally achieves a first control unit and a second control unit as will be described later in details.

The ECU 30 controls the drive of the engine 10 and the electric motor 15.

For example, the ECU 30 controls torque of the engine 10 by controlling a throttle opening degree, ignition timing, and a fuel injection amount of the engine 10. Further, the ECU 30 controls the inverter 17 to adjust an amount of electric power transmitted and received between the electric motor 15 and the main battery 16, which controls torque of the electric motor 15. Furthermore, the ECU 30 controls the drive of the K0 clutch 14, the lockup clutch 20, and the automatic transmission 19 by controlling the hydraulic control mechanism 22. The ECU 30 is input with detection signals from an ignition switch 31, an engine rotational speed sensor 32 detecting a rotational speed of the engine 10, and an accelerator opening degree as a depression amount of the accelerator pedal by a driver.

The ECU 30 is capable of supplying hydraulic pressure to the K0 clutch 14 by controlling the drive of the electric oil pump 23. Further, the ECU 30 is capable of controlling hydraulic pressure supplied to the K0 clutch 14 by the mechanical oil pump 24 by controlling the output torque of the electric motor 15.

[Starting Engine in Comparative Example]

Figure 2:
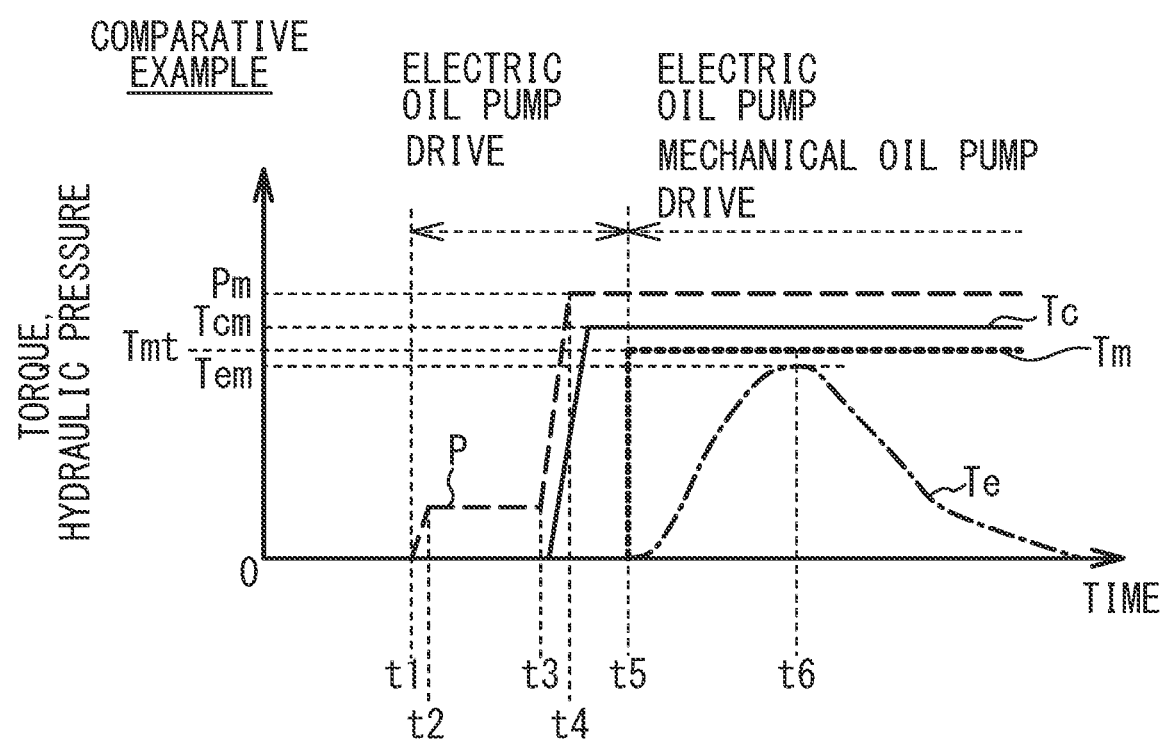
FIG. 2 is a timing chart at the time of starting an engine in a comparative example.

Next, start of the engine 10 in a comparative example will be described. FIG. 2 is a timing chart at the time of starting the engine 10 in the comparative example. FIG. 2 illustrates transition of supply hydraulic pressure P [Pa], a transmission torque capacity Tc [N·m], electric motor output torque Tm [N·m], and engine reaction torque Te [N·m]. In FIG. 2, a vertical axis indicates torque and oil pressure, and a horizontal axis indicates time. Herein, the supply hydraulic pressure P is the pressure of the hydraulic oil supplied to the K0 clutch 14. The transmission torque capacity Tc is the magnitude of the torque capable of being transmitted between the engine 10 and the electric motor 15 by the K0 clutch 14. The electric motor output torque Tm is the torque output from the electric motor 15. The engine reaction torque Te will be described later. Further, in FIG. 2, the supply hydraulic pressure P is indicated by a broken line, the transmission torque capacity Tc is indicated by a solid line, the electric motor output torque Tm is indicated by a dotted line, and the engine reaction torque Te is indicated by an alternate long and short dash line.

The engine reaction torque Te is a negative torque that acts to reduce rotational speed of the engine 10 when the electric motor 15 cranks and starts the stopped engine 10. The engine reaction torque Te mainly consists of reaction force generated when air is compressed by pistons of the engine 10, inertial torque generated in accelerating a rotating object, and drag torque of each rotating part. The engine reaction torque Te increases as the rotational speed of the engine 10 increases when the electric motor 15 cranks the engine 10. The engine reaction torque Te reaches the maximum value Tem, immediately before combustion in the engine 10 starts at a predetermined rotational speed or higher. After that, the engine 10 starts driving in a self-sustained manner, and the engine reaction torque Te gradually decreases to zero. Therefore, in order to start the engine 10 by the electric motor 15, the electric motor output torque Tm needs to be greater than the maximum value Tem of the engine reaction torque Te.

As illustrated in FIG. 2, when the ignition switch 31 is turned on, the electric oil pump 23 drives with the engine 10 and the electric motor 15 stopped, and then the hydraulic pressure P supplied to the K0 clutch 14 starts to increase (time t1). After that, the clutch piston starts to drive against urging force of the return spring of the K0 clutch 14 (time t2), and then the supply hydraulic pressure P becomes substantially constant. After that, the clutch piston of the K0 clutch 14 presses one of two friction plates to the other (time t3), and the friction plates of the K0 clutch 14 come into contact with each other, which brings the K0 clutch 14 into the engaged state, and then the supply hydraulic pressure P increases to a maximum value Pm (time t4). As a result, the transmission torque capacity Tc also increases to a maximum value Tcm. Herein, the maximum value Tcm is greater than the maximum value Tem of the engine reaction torque Te as illustrated in FIG. 2. In other words, the supply hydraulic pressure P increases to the maximum value Pm such that the maximum value Tcm of the transmission torque capacity Tc becomes greater than the maximum value Tem of the engine reaction torque Te.

After that, the electric motor 15 starts, the electric motor output torque Tm increases to target torque Tmt for cranking the engine 10, and then the engine 10 starts to be cranked via the K0 clutch 14 (time t5). As a result, the supply hydraulic pressure P is maintained at the maximum value Pm by the electric oil pump 23 and the mechanical oil pump 24 interlocking with the rotation of the electric motor 15. Further, the target torque Tmt of the electric motor output torque Tm is set to a value greater than the maximum value Tem of the engine reaction torque Te. Therefore, when the electric motor 15 cranks the engine 10 and the rotational speed thereof achieves a rotational speed at which the engine 10 is capable of driving in the self-sustained manner, fuel injection and ignition start (time t6), and then the engine 10 starts, which gradually decreases the engine reaction torque Te.

In the comparative example as described above, the electric oil pump 23 increases the transmission torque capacity Tc to the maximum value Tcm, before the electric motor 15 starts to crank the engine 10. Therefore, the power consumption of the electric oil pump 23 is large.

[Starting Engine in Present Embodiment]

Figure 3:
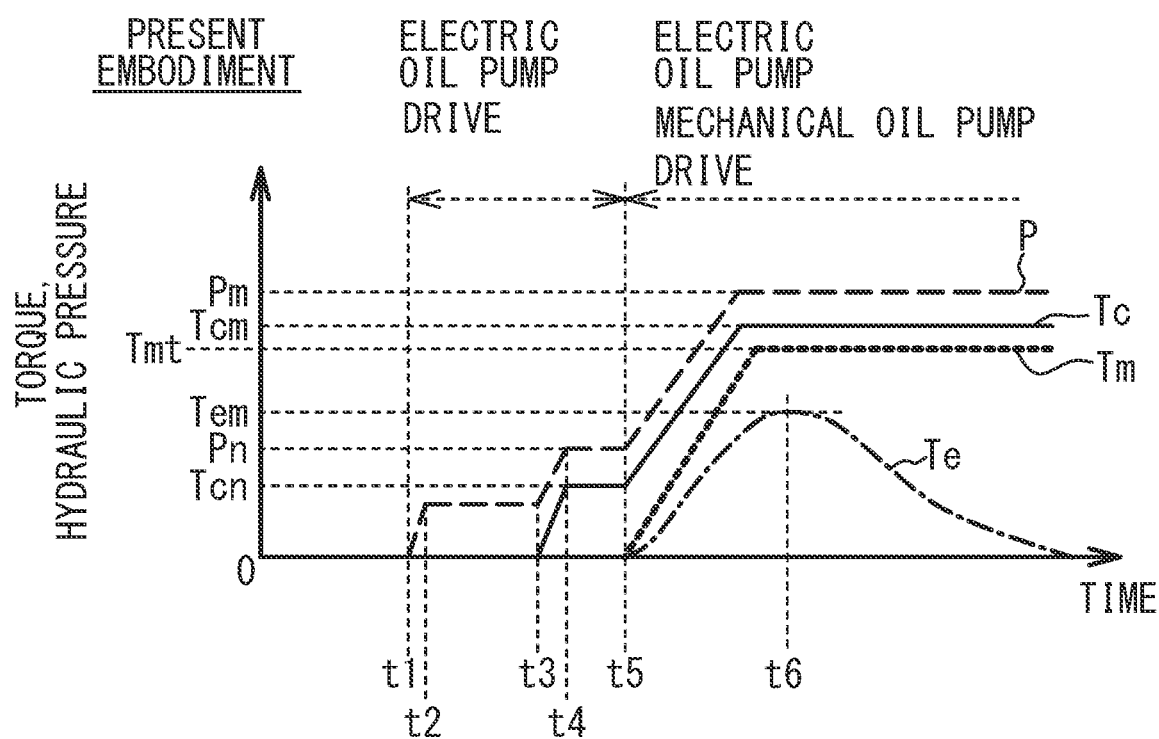
FIG. 3 is a timing chart at the time of starting the engine in a present embodiment.

FIG. 3 is a timing chart at the time of starting the engine 10 in the present embodiment. FIG. 3 corresponds to FIG. 2. In the present embodiment, the electric oil pump 23 increases the supply hydraulic pressure P to a value Pn smaller than the maximum value Pm mentioned above. Therefore, the transmission torque capacity Tc increases to a value Tcn smaller than the maximum value Tcm exemplified in the comparative example. Further, although the value Tcn of the transmission torque capacity Tc brings the K0 clutch 14 into the engaged state with the engine 10 and the electric motor 15 stopped, the value Tcn is smaller than the maximum value Tem of the engine reaction torque Te. Assuming that the cranking starts without driving the mechanical oil pump 24 when the transmission torque capacity Tc is maintained at the value Tcn, the K0 clutch 14 might slip when the engine reaction torque Te becomes the value Tcn or more. It is thus difficult to increase the rotational speed of the engine 10 to rotational speed at which the engine 10 is capable of driving in the self-sustained manner. The value Tcn is an example of a first torque value.

Also in the present embodiment like the comparative example, the electric oil pump 23 drives and increases the supply hydraulic pressure P (time t1), the piston of the K0 clutch 14 starts to drive (time t2), and then the piston presses one of the two friction plates to the other (time t3). After that, the friction plates of the K0 clutch 14 come into contact with each other, which brings the K0 clutch 14 into the engaged state (time t4). Herein, in the present embodiment, the electric oil pump 23 increases the supply hydraulic pressure P to the value Pn, and the transmission torque capacity Tc also increases to the value Tcn as described above.

After that, when the electric motor 15 starts to crank the engine 10 (time t5), the electric motor output torque Tm increases to the target torque Tmt at a gradual increasing rate in the present embodiment as compared with the comparative example. Specifically, while each of the electric motor output torque Tm and the transmission torque capacity Tc is maintained greater than the engine reaction torque Te, the electric motor output torque Tm gradually increases to the target torque Tmt. The transmission torque capacity Tc is maintained greater than the engine reaction torque Te, which makes it possible to prevent the K0 clutch 14 from slipping. Further, the electric motor output torque Tm is maintained greater than the engine reaction torque Te, which makes it possible to suitably crank the engine 10. As a result, while the engine 10 is cranked, the electric oil pump 23 and the mechanical oil pump 24 increase the supply hydraulic pressure P to the maximum value Pm, and the transmission torque capacity Tc also increases to the maximum value Tcm.

When the rotational speed of the engine 10 increases to the rotational speed at which the engine 10 is capable of driving in the self-sustained manner, fuel injection and ignition are executed to start combustion in the engine 10 (time t6), and then the engine reaction torque Te gradually decreases.

In the present embodiment as described above, even when the electric oil pump 23 increases the transmission torque capacity Tc only to the value Tcn, the electric motor 15 cranks and starts the engine 10. It is therefore possible to suppress the power consumption of the electric oil pump 23. For example, instead of the electric oil pump 23, a low-output electric oil pump or a small electric oil pump capable of increasing the transmission torque capacity Tc only to the value Tcn may be thus used. Using the low-power electric oil pump makes it possible to suppress a manufacturing cost thereof. Further, using the small electric oil pump makes it possible to suppress a space occupied thereby in the hybrid vehicle 1.

Additionally, the value Tcn of the transmission torque capacity Tc is preferably 50% or less of the maximum value Tcm of the transmission torque capacity Tc. This makes it possible to effectively suppress the power consumption of the electric oil pump 23.

Further, in the present embodiment as described above, the electric motor output torque Tm gradually increases as compared with the comparative example, so that the rotational speed of the engine 10 having been cranked also gradually increases. This makes it possible to suppress the maximum value Tem of the engine reaction torque Te to be low. In particular, this makes it possible to suppress the inertial torque of the engine 10 to be low. It is therefore possible to prevent the K0 clutch 14 from slipping during cranking, and to suppress the power consumption of the electric motor 15 to be consumed by the cranking.

Further, after the electric motor 15 starts, each of the transmission torque capacity Tc and the electric motor output torque Tm may be maintained greater than the engine reaction torque Te, and the target torque Tmt of the electric motor output torque Tm may be set to a smaller value. It is thus possible to further suppress the power consumption of the electric motor 15 due to the cranking.

In the example of FIG. 3, the value Tcn of the transmission torque capacity Tc is smaller than, but not limited to, the maximum value Tem of the engine reaction torque Te. For example, the value Tcn of the transmission torque capacity Tc may be greater than the maximum value Tem of the engine reaction torque Te, as long as the value Tcn of the transmission torque capacity Tc is smaller than the maximum value Tcm. Also in this case, it is possible to suppress the power consumption of the electric oil pump 23 as compared with the comparative example in which the electric oil pump 23 increases the transmission torque capacity Tc to the maximum value Tcm.

In the example of FIG. 3, the increasing rate of the electric motor output torque Tm to the target torque Tmt is, but not limited to, constant. The increasing rate may be changed when the electric motor output torque Tm increases.

Figure 4:
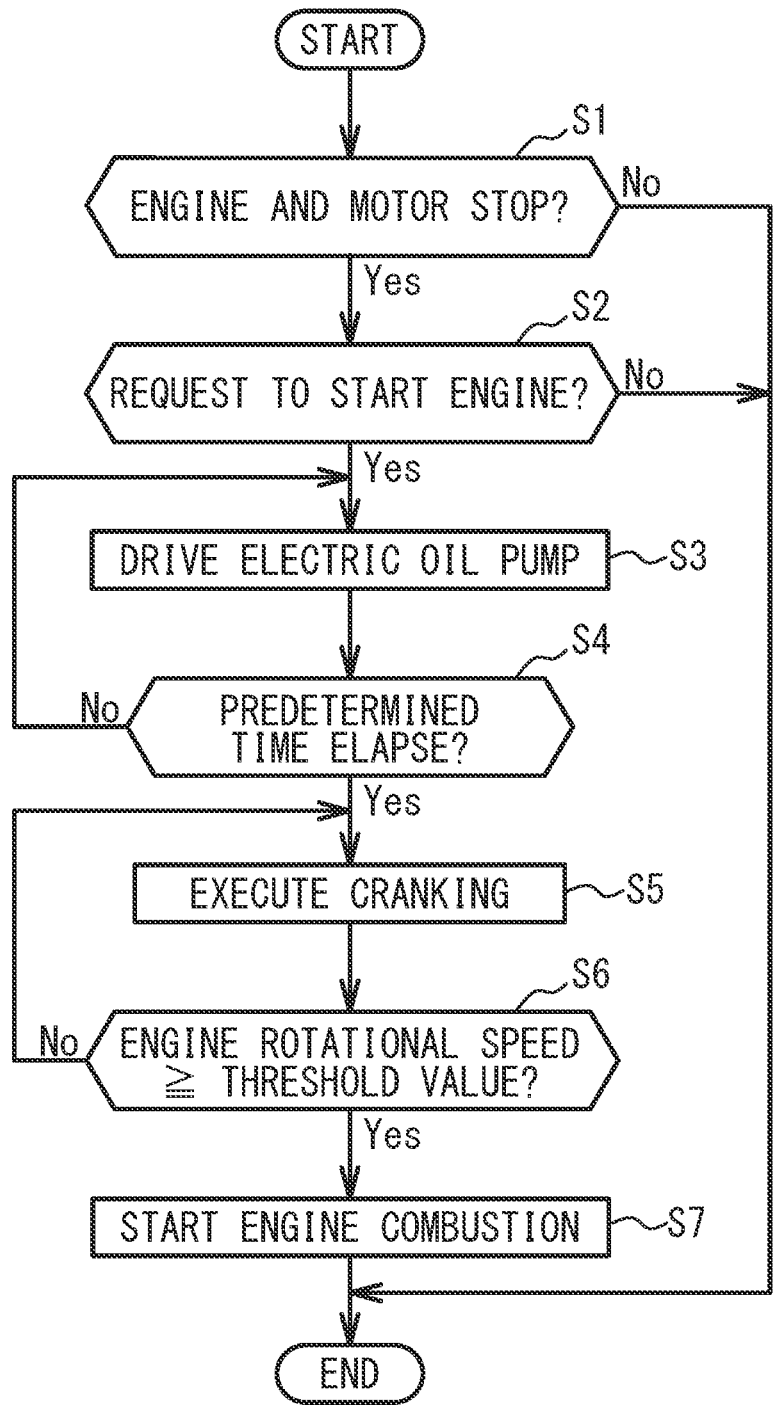
FIG. 4 is a flowchart illustrating an example of engine start control in the present embodiment.

FIG. 4 is a flowchart illustrating an example of engine start control in the present embodiment. This control is repeatedly executed with the ignition switch 31 turned on. The ECU 30 determines whether or not the engine 10 and the electric motor 15 stop (step S1). When a negative determination is made in step S1, this control ends. When a positive determination is made in step S1, the ECU 30 determines whether or not there is a request to start the engine 10 (step S2). When a negative determination is made in step S2, this control ends.

When a positive determination is made in step S2, the ECU 30 drives the electric oil pump 23 (step S3), and determines whether or not a predetermined time has elapsed from the time when the driving of the electric oil pump 23 starts (step S4). Herein, the predetermined time is a time required from the time when the electric oil pump 23 starts driving to the time when the K0 clutch 14 is brought into the engaged state and the transmission torque capacity Tc reaches the value Ten. The predetermined time is calculated beforehand on the basis of experimental results and is stored in the memory of the ECU 30. When a negative determination is made in step S4, the process of step S3 is continued. Steps S3 and S4 are examples of processes executed by the first control unit.

When a positive determination is made in step S4, the ECU 30 starts to crank the engine 10 by use of the electric motor 15 (step S5). Specifically, as illustrated in FIG. 3, the electric motor output torque Tm gradually increases to the target torque Tmt so as to maintain each of the electric motor output torque Tm and the transmission torque capacity Tc greater than the engine reaction torque Te. The increasing rate of the electric motor output torque Tm at this time is set to a value calculated beforehand on the basis of experimental results. Step S5 is an example of the process executed by the second control unit.

The ECU 30 determines whether or not the rotational speed of the engine 10 exceeds a threshold value (step S6). The threshold value is set to the rotational speed at which the engine 10 is capable of driving in the self-sustained manner. When a negative determination is made in step S6, the process of step S5 is continued. When a positive determination is made in step S6, the ECU 30 executes fuel injection and ignition in the engine 10 to start combustion (step S7). Thus, the engine 10 starts in the self-sustained manner. In such a manner, it is possible to suppress the power consumption of the electric oil pump 23 and to suitably start the engine 10.

In the present embodiment, a case where the engine start control is executed by, but not limited to, the single ECU 30 is exemplified. For example, the engine start control may be executed by an engine ECU that controls the engine 10, an electric motor ECU that controls the electric motor 15, a clutch ECU that controls the K0 clutch 14, and a hybrid ECU that controls these ECUs.

Although some embodiments of the present disclosure have been described in detail, the present disclosure is not limited to the specific embodiments but may be varied or changed within the scope of the present disclosure as claimed.

The invention claimed is:

1. A hybrid vehicle comprising:
an engine and an electric motor as driving power sources;
a clutch of a hydraulic type provided between the engine and the electric motor;
an electric oil pump that supplies hydraulic pressure to the clutch;
a mechanical oil pump that interlocks with a rotation of the electric motor and supplies hydraulic pressure to the clutch; and
a controller that controls the electric motor and the electric oil pump,
wherein
the controller includes:
   a first control unit that increases a transmission torque capacity of the clutch to a first torque value by driving the electric oil pump, when the engine and the electric motor stop and there is a request to start the engine; and
   a second control unit that cranks the engine by driving the electric motor and increases the transmission torque capacity of the clutch to a second torque value greater than the first torque value by driving the mechanical oil pump interlocking with the rotation of the electric motor, after the transmission torque capacity of the clutch reaches the first torque value;
the transmission torque capacity of the clutch is increased from the first torque value in accordance with driving of the electric motor, and
the second control unit gradually increases the transmission torque capacity of the clutch to the second torque value while gradually increasing output torque of the electric motor, such that each of the output torque of the electric motor and the transmission torque capacity of the clutch is maintained greater than a reaction force torque value of the engine when the electric motor cranks the engine.

2. The hybrid vehicle according to claim 1, wherein magnitude of the first torque value is 50% or less of magnitude of the second torque value.

3. The hybrid vehicle according to claim 1, wherein
the first torque value is smaller than the reaction force torque value of the engine when the electric motor cranks the engine, and
the second torque value is greater than the reaction force torque value.

\* \* \* \* \*